US006892382B1

(12) United States Patent
Hapner et al.

(10) Patent No.: US 6,892,382 B1
(45) Date of Patent: May 10, 2005

(54) METHOD AND APPARATUS FOR IMPLEMENTING DEPLOYMENT DESCRIPTORS IN AN ENTERPRISE ENVIRONMENT

(75) Inventors: Mark W. Hapner, San Jose, CA (US); Vladimir Matena, Redwood City, CA (US); Kevin Osborn, Newton, MA (US); Hans Hrasna, Carlisle, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/564,067

(22) Filed: May 3, 2000

Related U.S. Application Data
(60) Provisional application No. 60/139,238, filed on Jun. 14, 1999, provisional application No. 60/139,327, filed on Jun. 14, 1999, provisional application No. 60/133,205, filed on May 7, 1999, and provisional application No. 60/133,054, filed on May 6, 1999.

(51) Int. Cl.$^7$ ............................. G06F 9/44; G06F 9/445
(52) U.S. Cl. ....................................... 717/174; 717/168
(58) Field of Search ................................ 717/168, 169, 717/174, 199, 175

(56) References Cited

U.S. PATENT DOCUMENTS 5,721,824 A * 2/1998 Taylor .......................... 709/203
5,835,777 A * 11/1998 Staelin ......................... 717/175

OTHER PUBLICATIONS

Vlada Matena and Mark Hapner, "Sun Microsystems Enterprise JavaBeans™," Mar. 21, 1998, Sun Microsystems, Inc., Version 1.0, pp. 1–181.*

"FreeBSD General Commands Manual: pkg_create", Apr. 21, 1995, FreeBSD Organization.*

"FreeBSD General Commands Manual: pkg_add", Nov. 25, 1994, FreeBSD Organization.*

"FreeBSD Porter's Handbook", 2000, the FreeBSD Organization.*

"JAR—Java Archive", Apr. 28, 1999, Sun Corporation.*

* cited by examiner

*Primary Examiner*—Kakali Chaki
*Assistant Examiner*—Eric B. Kiss
(74) *Attorney, Agent, or Firm*—Beyer Weaver & Thomas LLP (57) ABSTRACT

Methods and apparatus for implementing deployment descriptors which are used to deploy modules in an enterprise environment are disclosed. According to one aspect of the present invention, a method for deploying an application using a deployment tool for use on a platform server includes creating the application, creating an application deployment descriptor for the application, packaging the application in an archive, and deploying the application packaged in the archive. Creating the application includes obtaining an application component which has an associated application component deployment descriptor that has information relating to the deployment of the application component. The application deployment descriptor for the application includes information arranged to identify the application component, and packaging the application in an archive includes packaging the application component, the application component deployment descriptor, and the application deployment descriptor. The application packaged in the archive is deployed using the application component deployment descriptor.

21 Claims, 10 Drawing Sheets

METHOD AND APPARATUS FOR IMPLEMENTING DEPLOYMENT DESCRIPTORS IN AN ENTERPRISE ENVIRONMENT

CROSS-REFERENCE TO RELATED APPLICATIONS

The present invention claims priority of co-pending provisional U.S. patent application Ser. No. 60/133,054, May 6, 1999, co-pending provisional U.S. patent application Ser. No. 60/133,205, filed May 7, 1999, co-pending provisional U.S. patent application Ser. No. 60/139,238, filed Jun. 14, 1999, and co-pending provisional U.S. patent application Ser No. 60/139,327, filed Jun. 14, 1999, which are each incorporated herein by reference in their entirety.

BACKGROUND OF THE INVENTION

1. Field of the Invention

The present invention relates generally to enterprise information systems. More particularly, the present invention relates to the use of deployment descriptors in modules packaged for use in enterprise-based applications.

2. Description of the Related Art

As the use of enterprise environments is increasing, it becomes necessary to increase the overall efficiency with which the enterprise environments may be used. Increasing the efficiency typically includes reducing the costs of implementing enterprises and lowering response times associated with enterprises.

Figure 1:
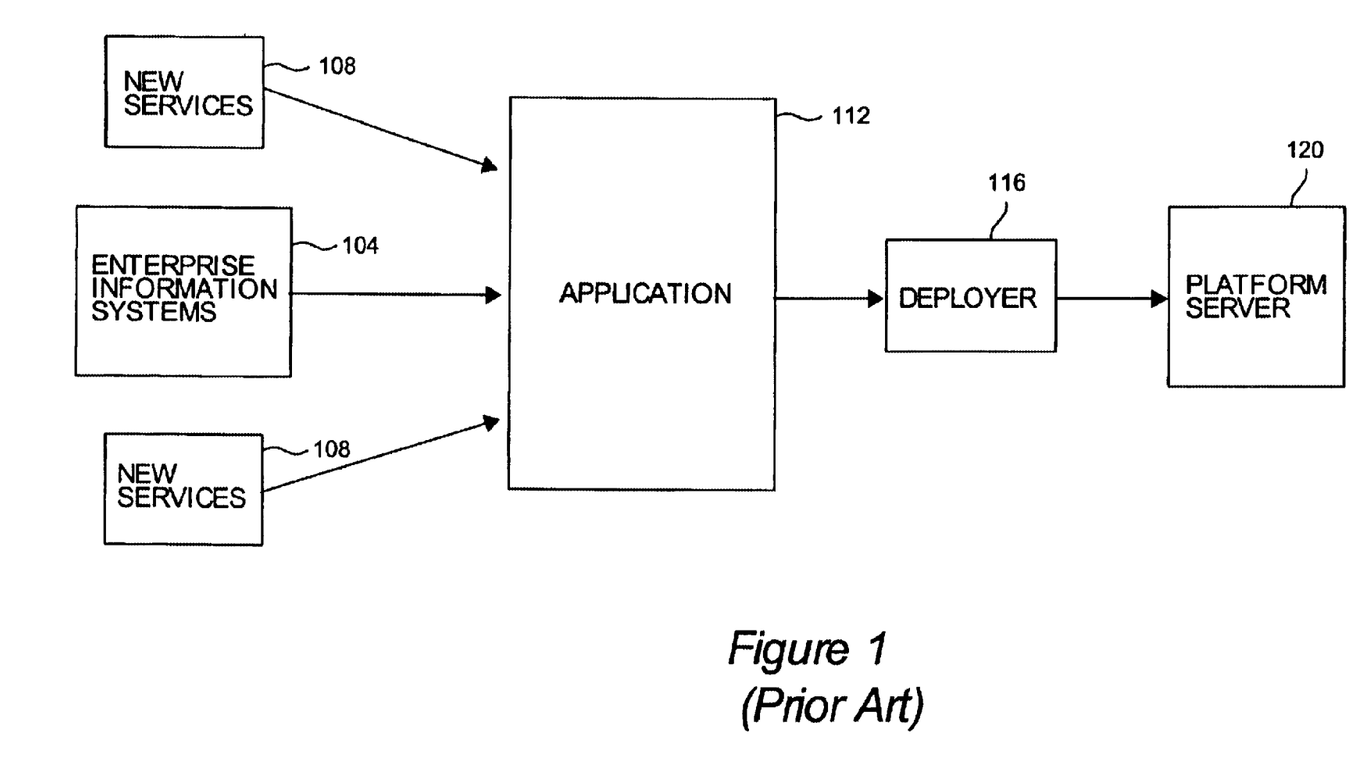
FIG. 1 is a diagrammatic representation of a composition model for an enterprise application.

Enterprise information systems are typically part of an enterprise, and provide services to users of an enterprise. When new services are to be provided to users, the new services generally must be integrated with the enterprise information systems. FIG. 1 is a diagrammatic representation of a composition model for an enterprise application. An enterprise application 112 includes an enterprise information system 104 and new services 108. Application 112 is arranged to be deployed by a deployer 116 such that a deployed application 112 may be used on a platform 120.

Typically, in order to enable new services 108 to be offered to a user along with enterprise information system 104, new services 108 must be integrated with enterprise information system 104 within application 112. In order to integrate new services 108 with enterprise information system 104, a developer is responsible for coding specific interactions between new services 108 and enterprise information system 104. In other words, modifications are generally made to new services 108 and enterprise information system 104 such that new services 108 may be offered along with services included in enterprise information system 104.

The need to code interactions, such as transaction management interactions and security management interactions, may be inefficient since each time a new service is to be offered to a user, a developer must code interactions with the new service. Coding interactions generally does not enable new services to be rapidly deployed. In addition, the need to code interactions often places a burden on a developer to learn how different services interact.

Therefore, what is desired is an enterprise system which allows new services to be efficiently deployed. In other words, what is needed is a system which eliminates the need for a developer to code specific interactions between services of the system.

SUMMARY OF THE INVENTION

The present invention relates to deployment descriptors which are used to deploy modules in an enterprise environment. According to one aspect of the present invention, a method for deploying an application using a deployment tool for use on a platform server includes creating the application, creating an application deployment descriptor for the application, packaging the application in an archive, and deploying the application packaged in the archive. Creating the application includes obtaining an application component which has an associated application component deployment descriptor that has information relating to the deployment of the application component. The application deployment descriptor for the application includes information arranged to identify the application component, and packaging the application in an archive includes packaging the application component, the application component deployment descriptor, and the application deployment descriptor. The application packaged in the archive is deployed using the application component deployment descriptor.

In one embodiment, creating the application further includes obtaining a second application component having an associated application component deployment descriptor. In such an embodiment, the application deployment descriptor includes information arranged to identify the second application component, and the archive further includes the second application component and the application component descriptor associated with the second application component.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

When applications are created such that services, e.g., transaction management services and security management services, are offered to a user, interactions between various services are coded by a developer to enable the services to be offered together. The need to code interactions between services may be inefficient since each time a new service is to be offered to a user, a developer must code interactions between existing services and the new service.

Implementing a data structure, e.g., a deployment descriptor, within each new service, e.g., module, that describes how the new service may be integrated with other services allows different services to be readily "fit" together. When a module is created to include a deployment descriptor, the need for a developer to code interactions between modules is effectively eliminated. The interaction of a given module with other modules is essentially described in the deployment descriptor of the given module. The use of deployment descriptors also enables a deployer to read a deployment descriptor associated with a module, and determine how to deploy the module as a part of an application or alone.

In general, applications which incorporate deployment descriptors include one or more components and an application deployment descriptor. Within the application deployment descriptor, components are generally listed, or otherwise grouped, as modules. Specifically, modules include one or more components of the same type, as well as a component level deployment descriptor. An application which incorporates deployment descriptors also facilitates the packaging and deployment of components as individual components, component libraries, and parts of applications. For example, it is possible for a deployment tool to use the deployment descriptors to readily determine how to deploy components as stand-alone components.

Figure 2:
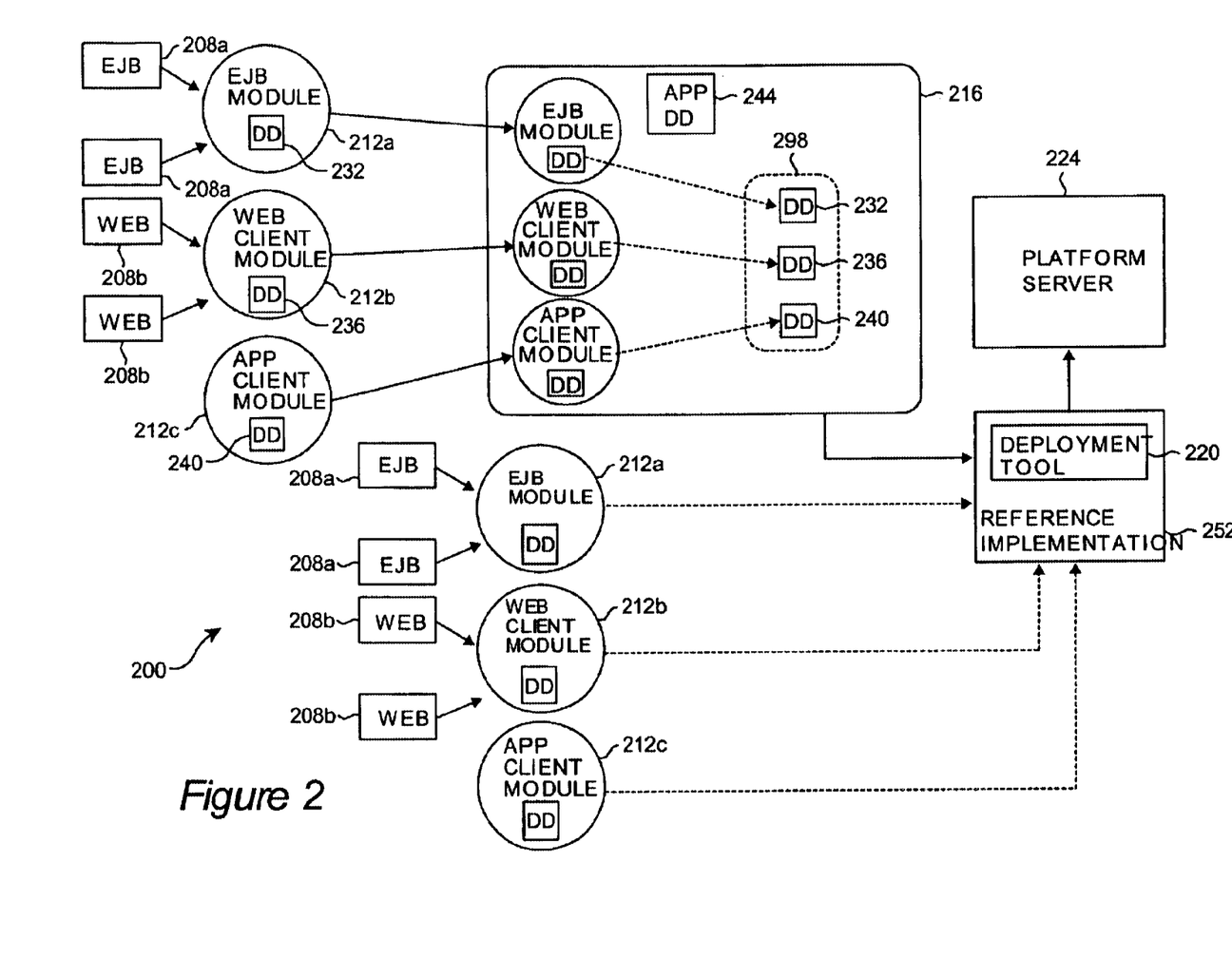
FIG. 2 is a diagrammatic representation of a composition model for modules with deployment descriptors in accordance with an embodiment of the present invention.

FIG. 2 is a diagrammatic representation of a composition model for modules with deployment descriptors in accordance with an embodiment of the present invention. A composition model 200 includes components 208, modules 212, an application 216, a deployment tool 220, and a platform server 224. Components 208 essentially make up modules 212 which are used as "building blocks" of application 216. Deployment tool 220 is arranged to deploy application 216, or individual modules 212, such that they may be used on platform server 224.

Component 208 are typically user-written, e.g., developer-written. Although component types may vary widely, they may include, but are not limited to, Enterprise JavaBeans™ (EJB™) architecture components 208a and web applications 208b. As will be appreciated by those skilled in the art, the EJB™ architecture is a component architecture for the development and deployment of component-based distributed business applications, and was developed by Sun Microsystems, Inc. of Palo Alto, Calif.

EJB™ architecture components 208a are grouped into a user-written EJB™ module 212a, which includes an EJB™ architecture component module deployment descriptor 232. EJB™ architecture component module 212a may be included in application 216 or, alternatively, EJB™ architecture component module 212a may be a stand-alone module which is deployed directly by deployment tool 220 without being assembled into application 216. In the described embodiment, EJB™ architecture component module deployment descriptor 232 contains substantially all declarative data which is necessary to deploy EJB™ architecture components 208 using deployment tool 220. Additionally, EJB™ architecture component module deployment descriptor 232 may also include assembly instructions which describe how EJB™ architecture components are composed into an application EJB™ architecture component module deployment descriptor 232 will be described below with reference to FIG. 7.

Web applications 208b may be substantially anything which is suitable for inclusion as a part of the World Wide Web. In one embodiment, web applications 208b may include servlets, or server-side programs written in the JAVA® programming language developed at Sun Microsystems, Inc. of Palo Alto, Calif. Web applications 208b are grouped into a web client module 212b, which includes a web client deployment descriptor 236 and is user-written. Web client deployment descriptor 236 will be discussed below with respect to FIG. 8.

Like EJB™ architecture component module 212a, web client module 212b may either be included in application 216 or deployed as a stand-alone module. Further, web client module 212b may also be deployed substantially directly by platform server 224, e.g., a web server. It should be appreciated that when web client module 212b is deployed by a web server, the web server generally includes deployment capabilities which are typically included in deployment tool 220.

Figure 9:
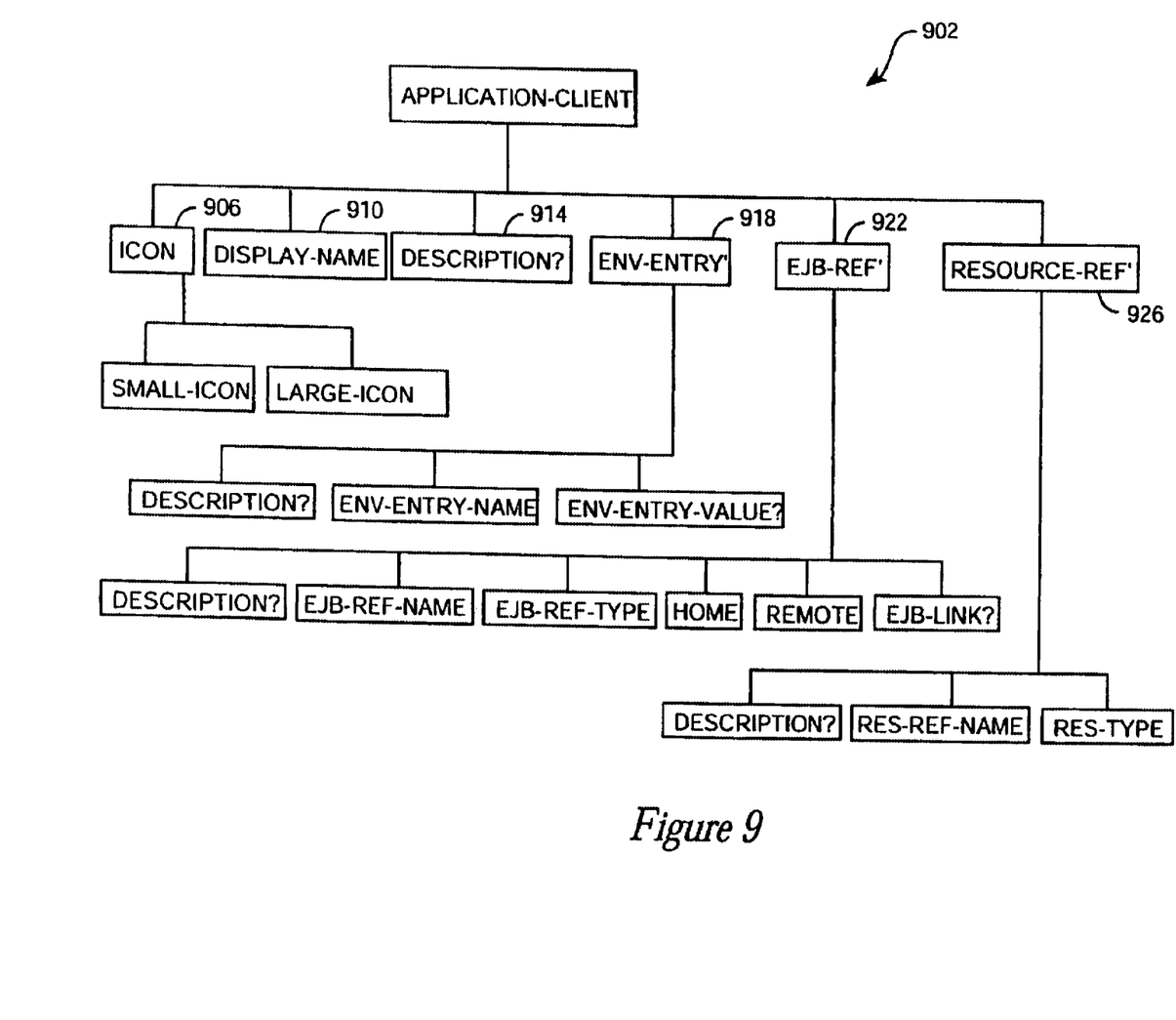
FIG. 9 is a diagrammatic representation of an application client module deployment descriptor in accordance with an embodiment of the present invention.

Application client module 212c; which includes an application client deployment descriptor 240 that will be discussed below with respect to FIG. 9, is often an application written in the JAVA® programming language by a developer. Such an application generally includes resource dependencies, but provides substantially no services, as will be understood by those skilled in the art. As was the a case for EJB™ architecture component module 212a and web client module 212b, application client module 212c may also be a stand-alone module which may be deployed directly by deployment tool 220.

Application 216 is assembled by an assembler who also creates an application deployment descriptor 244. Application deployment descriptor 244 contains a top level view of the contents of application 216, and will be described below with reference to FIG. 6. In general, application 216 is packaged in an archive file format, and substantially only includes modules 212 and application deployment descriptor 244. Within application 216, deployment descriptors 232, 236, 240 may be isolated into a target container 248 such that deployment tool 220 may readily access deployment descriptors 232, 236, 240.

As will be discussed below, application 216 may be edited, e.g., modules may be added and deleted, as necessary for a variety of different reasons. By way of example, application 216 may be edited to resolve roles for deployment tool 220. Alternatively, application 216 may be edited by an assembler to unify declarations of security roles. Unifying declarations for security roles may involve resolving different names for a given role into a substantially "global" name for the given role.

In some instances, editing application 216 may result in the removal or elimination of a previously existent module that is needed, for example, by a web client module. When a previously existent module is eliminated from application 216, at the time of deployment, a resolution must effectively be reached regarding the missing module. Specifically, when a needed module is not a part of application 216, that needed module essentially must be on, or accessible with respect to, platform server 224.

Deployment tool 220 is associated with a reference implementation 252, and is used by a deployer either to deploy application 216 or to deploy modules 212 as stand-alone modules. Deployment tool 220 is generally arranged to read deployment descriptors 232, 236, 240, 244, and to deploy module 212 according to the specifications and requirements of each module type. In addition, deployment tool 220 installs application 216 onto a suitable platform, then configures and integrates application 216 into an existing infrastructure. Platform server 224 may be substantially any suitable application server. By way of example, suitable application servers may include, but are not limited to, EJB™ architecture component servers, desktops, and web servers.

Figure 3:
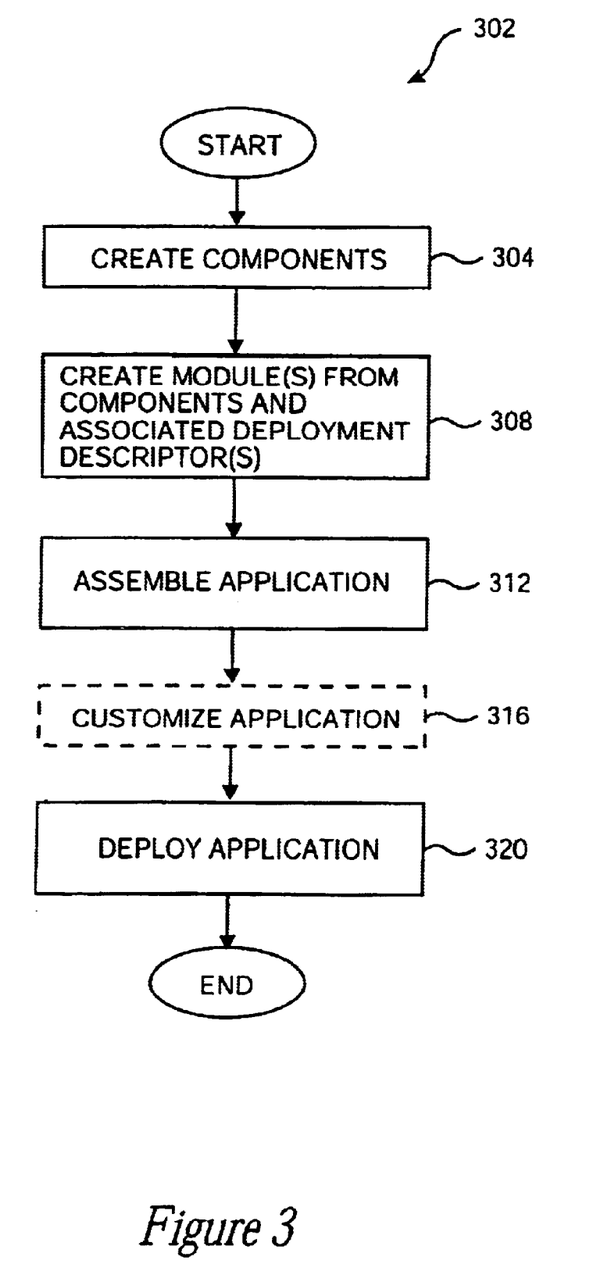
FIG. 3 is a process flow diagram which illustrates the steps associated with creating and deploying an application which incorporates deployment descriptors in accordance with an embodiment of the present invention.

Referring next to FIG. 3, the steps associated creating and deploying an application will be described in accordance with an embodiment of the present invention. A process 302 of creating and deploying an application begins at step 304 in which components are created by a component developer. In the described embodiment, the components are discrete Java™ 2 Platform, Enterprise Edition (J2EE® platform) components that are generally suitable for use on a J2EE® platform developed by Sum Microsystems, Inc., of Palo Alto, Calif. It should be appreciated, however, that the components and the platform on which the components are intended for use may vary widely.

Once components, which may be EJBs™ architecture components or any suitable web applications, for example, are created in step 304, modules are created from the components in step 308. In addition, deployment descriptors associated with the modules are also created in step 308. The deployment descriptor for each individual module includes substantially all declarative data which is needed to deploy components associated with the individual module in a Java™ platform archive (JAR) file format developed by Sun Microsystems, Inc., of Palo Alto, Calif., e.g., the JAR which holds an overall application that includes the individual module.

Each module that is created typically includes one or more components of the same container type, as well as component deployment descriptor of that particular type. By way of example, for components which are web applications, the module created from the web applications may be a web client module, while the deployment descriptor may be a web client deployment descriptor. Although modules, e.g., J2EE® platform modules, are arranged to be "building blocks" for an application, e.g., a J2EE® platform application, the modules may also be deployed as a stand-alone module, as mentioned above with respect to FIG. 2.

After modules are created in step 308, then an overall application is assembled in step 312 from the various modules. An application typically includes one or more modules and an application deployment descriptor which effectively represents a top level view of the contents of an application. In one embodiment, when the application is a J2EE® platform application, the application is packaged in a JAR file format. One process of assembling an overall application will be discussed below with reference to FIG. 4.

Once the application is assembled in step 312, process flow may proceed to an optional step 316 in which the assembled application is customized. As will be appreciated by those skilled in the art, it may be desirable to customize an application before the application may be deployed into an enterprise. Customizing an application may include adding new modules, removing existing modules, and changing the content of modules.

When the application is assembled, and optionally customized, then process flow moves to step 320 where the application is deployed, e.g., deployed by a deployment tool. During deployment, the application is installed on a suitable platform such as a J2EE® platform. Once installed, the application may be configured and integrated into an existing infrastructure. Each module which is a part of the application and, hence, is listed in the application deployment descriptor associated with the application, is deployed appropriately. That is, in one embodiment, each module listed in the application deployment descriptor is installed in a suitable container, and the declarative properties of each module are set to reflect the values declared by the deployment descriptor element for each component associated with each module. After the application is deployed, then the process of creating an deploying an application which incorporates deployment descriptors is completed.

Figure 4:
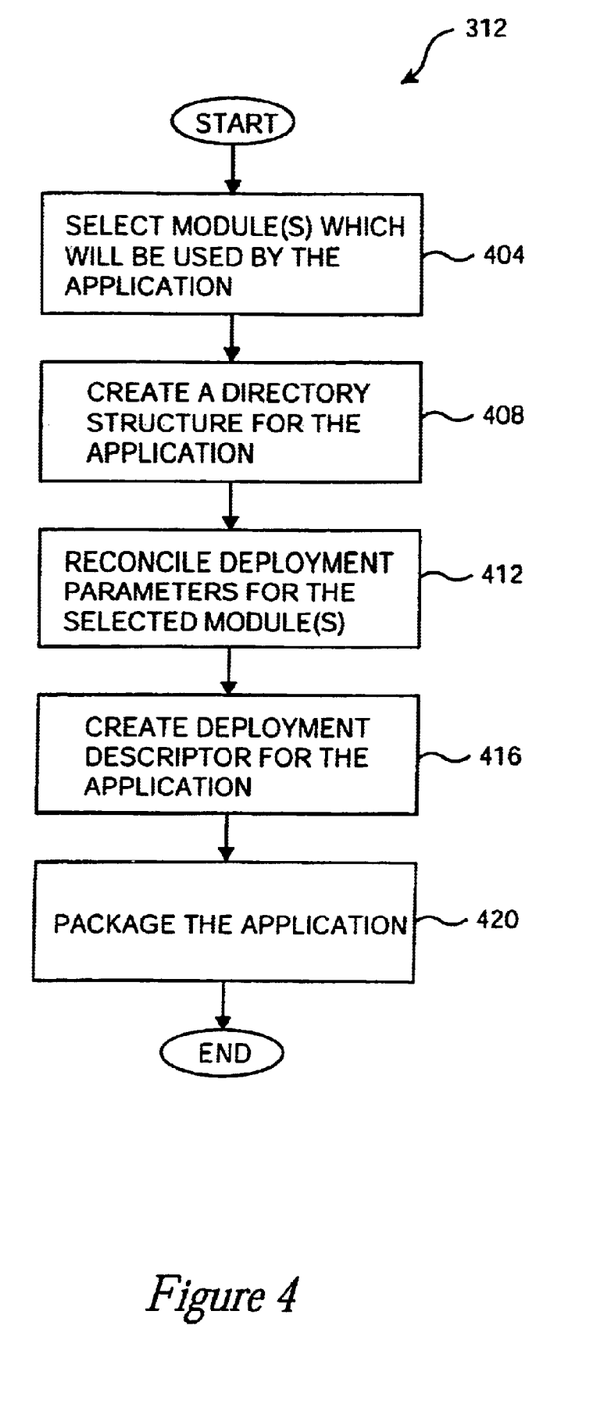
FIG. 4 is a process flow diagram which illustrates the steps associated with assembling an application which incorporates deployment descriptors, i.e., step 312 of FIG. 3, in accordance with an embodiment of the present invention.

One method that is suitable for assembling an application will be described with reference to FIG. 4. FIG. 4 is a process flow diagram which illustrates the steps associated with assembling an application which incorporates deployment descriptors, i.e., step 312 of FIG. 3, in accordance with an embodiment of the present invention. A process 312 of assembling an application begins at step 404 in which substantially any modules that will be used to form the application are selected or otherwise identified, e.g., by an application assembler.

Once modules are selected, then a directory structure for the application is created in step 408. The directory structure for the application is typically designed based upon the requirements of components within the selected modules. As a result, the steps associated with the creation of a directory structure may vary widely. In step 412, deployment parameters for the selected modules are reconciled. Reconciling deployment parameters includes, but is not limited to, satisfying dependencies and eliminating redundant security role names. In one embodiment, eliminating redundant security role names may include creating a single name which replaces other names which identify essentially the same security role. That is, unique security role names with redundant meanings may be renamed to a common name. It should be appreciated that the deployment parameter for the selected modules may be reconciled in substantially any suitable manner. By way of example, the reconciliation may occur through changing deployment descriptors in place or by overriding the deployment parameters.

Figure 6:
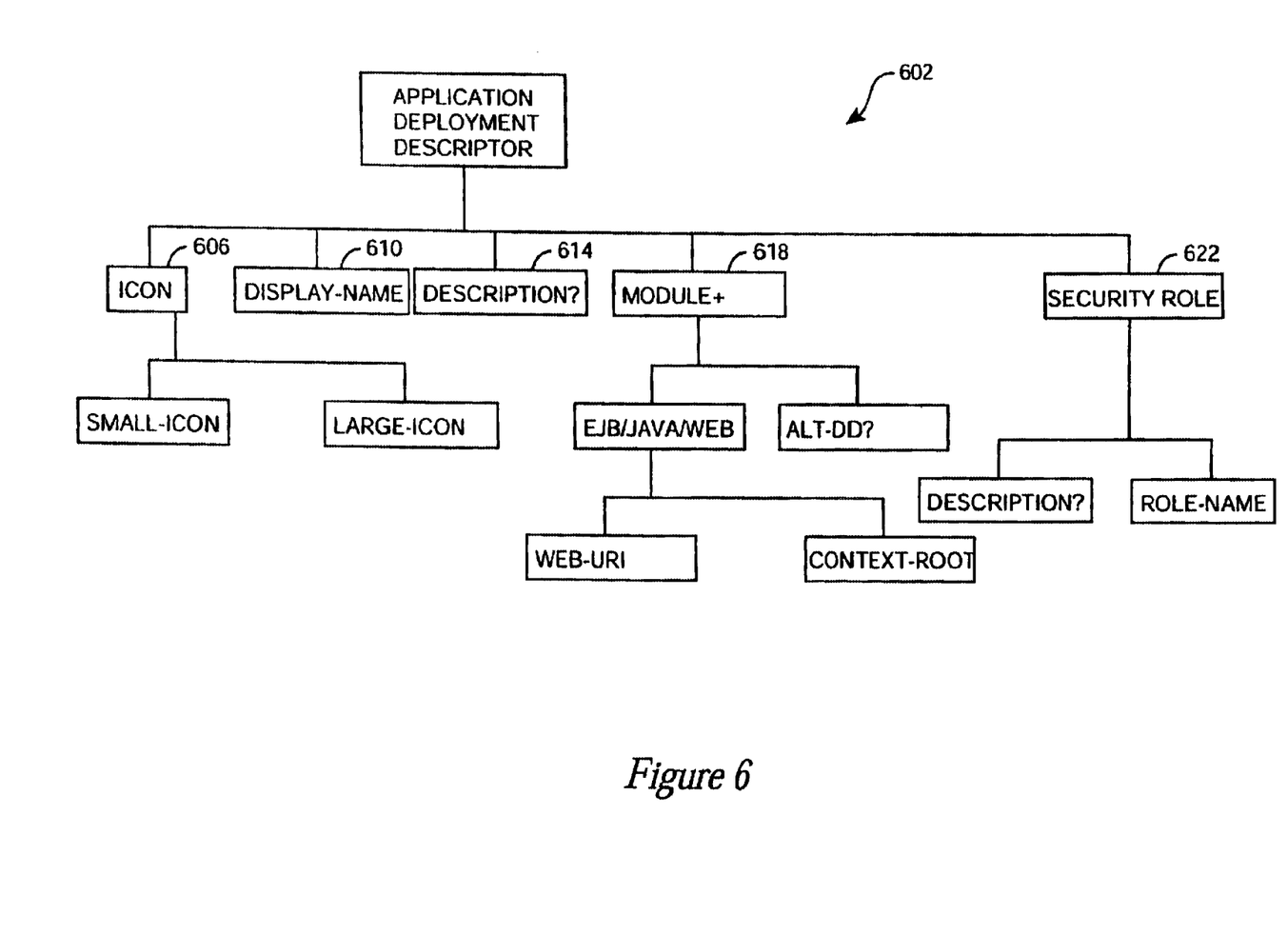
FIG. 6 is a diagrammatic representation of an application deployment descriptor in accordance with an embodiment of the present invention.

After deployment parameters are reconciled, then a deployment descriptor for the application, i.e., an application deployment descriptor, is created in step 416. When the application is a J2EE® platform application, then the application deployment descriptor may be an XML deployment descriptor. In other words, for a J2EE® platform application, the application deployment descriptor may be an XML document according to the document type definition for a J2EE® platform application XML document. The application deployment descriptor, which will be described below with reference to FIG. 6, is arranged to provide a listing of contents of the application, and to provide version links to deployment descriptors associated with modules.

From step 416, process flow proceeds to step 420 in which the application is packaged. Packaging an application may include, but is not limited to, placing modules and the application deployment descriptor into appropriate directories and packaging the directory structure in a JAR file using a JAR file format. Once the application is packaged, the process of assembling an application is completed.

In general, even after an application is packaged, modules may be added or removed before the application is deployed. Adding a module may include creating a new directory in the directory structure, or hierarchy, of the application to contain the new module. Alternatively, an application assembler may make a determination as to an appropriate location for a new module in the application package. Whether a new module is being added or an "old" modules is being removed, the deployment descriptors for the modules are edited to link internal dependencies for all current modules. In addition, the application deployment descriptor is typically also modified to identify the current modules.

Figure 5A:
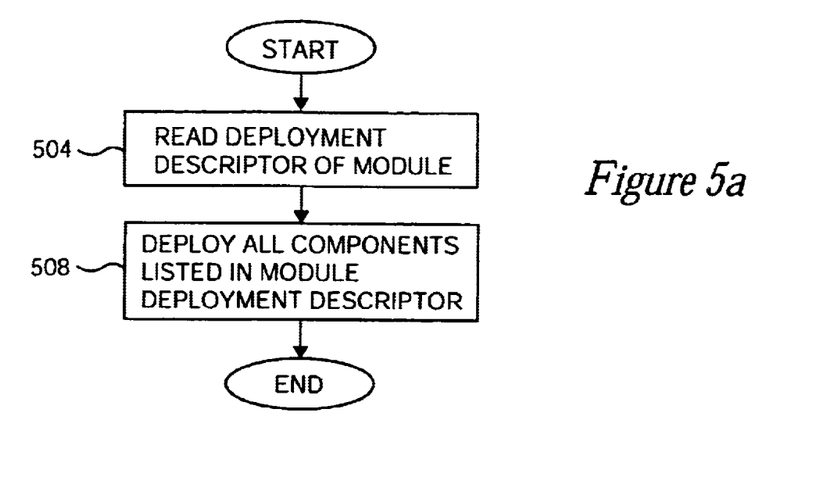
FIG. 5a is a process flow diagram which illustrates the steps associated with deploying a stand-alone module with a deployment descriptor in accordance with an embodiment of the present invention.

As described above with reference to FIG. 2, modules with deployment descriptors may either be stand-alone, e.g., independent, modules or part of an assembled application. With reference to FIG. 5a, the steps associated with deploying a stand-alone module will be described in accordance with an embodiment of the present invention. The process of deploying a stand-alone module begins at step 504 in which a deployment tool, which may be part of a reference implementation, reads the deployment descriptor of the module. Once the deployment descriptor is read, then all components listed in the deployment descriptor of the module are deployed in step 508. In other words, the deployment tool deploys all components identified in the deployment descriptor based upon the deployment requirements of the appropriate component specification. By way of example, for an EJB™ architecture component module, the deployment tool may deploy all EJB™ architecture components listed in the EJB™ architecture component module deployment descriptor according to a J2EE® platform EJB™ architecture component specification. When all listed components are deployed, then the process of deploying a stand-along module is completed.

Figure 5B:
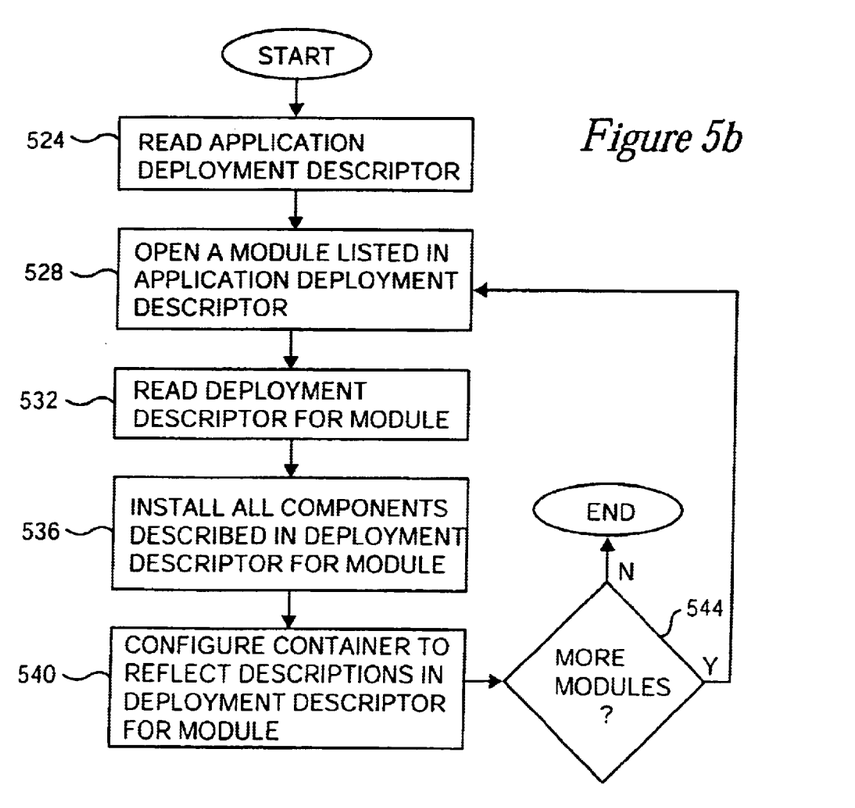
FIG. 5b is a process flow diagram which illustrates the steps associated with deploying an application which incorporates deployment descriptors, i.e., an application as packaged in step 420 of FIG. 4, in accordance with an embodiment of the present invention.

FIG. 5b is a process flow diagram which illustrates the steps associated with deploying an application which incorporates deployment descriptors, i.e., an application as packaged n step 420 of FIG. 4, in accordance with an embodiment of the present invention. The process begins at step 524 in which a deployment tool reads the application deployment descriptor of an application package. For an embodiment in which the application is a J2EE® platform application, the application deployment descriptors is read from the JAR which contains the application.

A module listed in the application deployment descriptor, e.g., the first listed module, is opened in step 528. Once the module is opened, then the deployment descriptor for the module is read in step 532. Reading the deployment descriptor for the module enables all components described in the deployment descriptor to be identified. In step 536, all components described in the deployment descriptor are installed into an appropriate container. The installation of the components is dependent, at least in part, upon the deployment requirements of the associated component specification. By way of example, the installation of an EJB™ architecture component may differ from the installation of a web application component, as specified by their respective component specifications.

After the components are installed in step 536, the container in which the components are installed is configured in step 540 to reflect descriptions provided in the deployment descriptor for the module. In other words, the deployment tool configures the container to reflect the value of properties declared by the corresponding element in the deployment descriptor for each component.

From step 540, process flow moves to step 544 in which a determination is made as to whether the application package includes additional modules. If the determination is that the application package does include additional modules, then process flow returns to step 528 where a subsequent module listed in the application deployment descriptor is opened. Alternatively, when it is determined that no additional modules are included in the application package, i.e., when it is determined that all modules have been processed, then the process of deploying an application is completed.

As previously mentioned, an application deployment descriptor generally includes a listing of all modules included in an application. In some embodiments, the application deployment descriptor may additionally include information such as a name and a description of the application. FIG. 6 is a diagrammatic representation of an application deployment descriptor in accordance with an embodiment of the present invention. An application deployment descriptor 602 may be a J2EE® platform application deployment descriptor, i.e., application deployment descriptor may be defined by a J2EE® platform application document type definition.

While the contents of application deployment descriptor 602 may vary, as shown, application deployment descriptor 602 includes an icon entry 606, a display-name entry 610, an optional description entry 614, at least one module entry 618, and a security-role entry 622. Icon entry 606, e.g., icon element 606, may be a universal record index (URI) which identifies a gif image or a jpeg image that represents the application with respect to a graphical user interface (GUI). Display-name entry 610 may be a name for the application. Typically, the application name is assigned to the application by an assembler, and is arranged to identify the application to the deployer at deployment time. Optional description entry 614 provides substantially any information that an assembler believes would be of use to a deployer in a user-readable format.

Module entry 618, or element, is arranged to represent a module, and in the described embodiment, holds either an EJB™ architecture component, an application client module, or a web element. Module entry 618 is also arranged to specify an optional URI to the post assembly version of the associated deployment descriptor. As will be appreciated by lo those skilled in the art, application deployment descriptor 602 typically includes one module entry 618 for each module in the overall application package.

Security-role entry 622 generally contains a definition of a security role that is global with respect to the application. In one embodiment, security-role entry 622 includes both a description of the security role, and an assigned name of the security role. Since there may be some inconsistency between security role names in application deployment descriptor 602 and at a component level, the names and descriptions in application deployment descriptor 602 typically override those at the component level.

Figure 7:
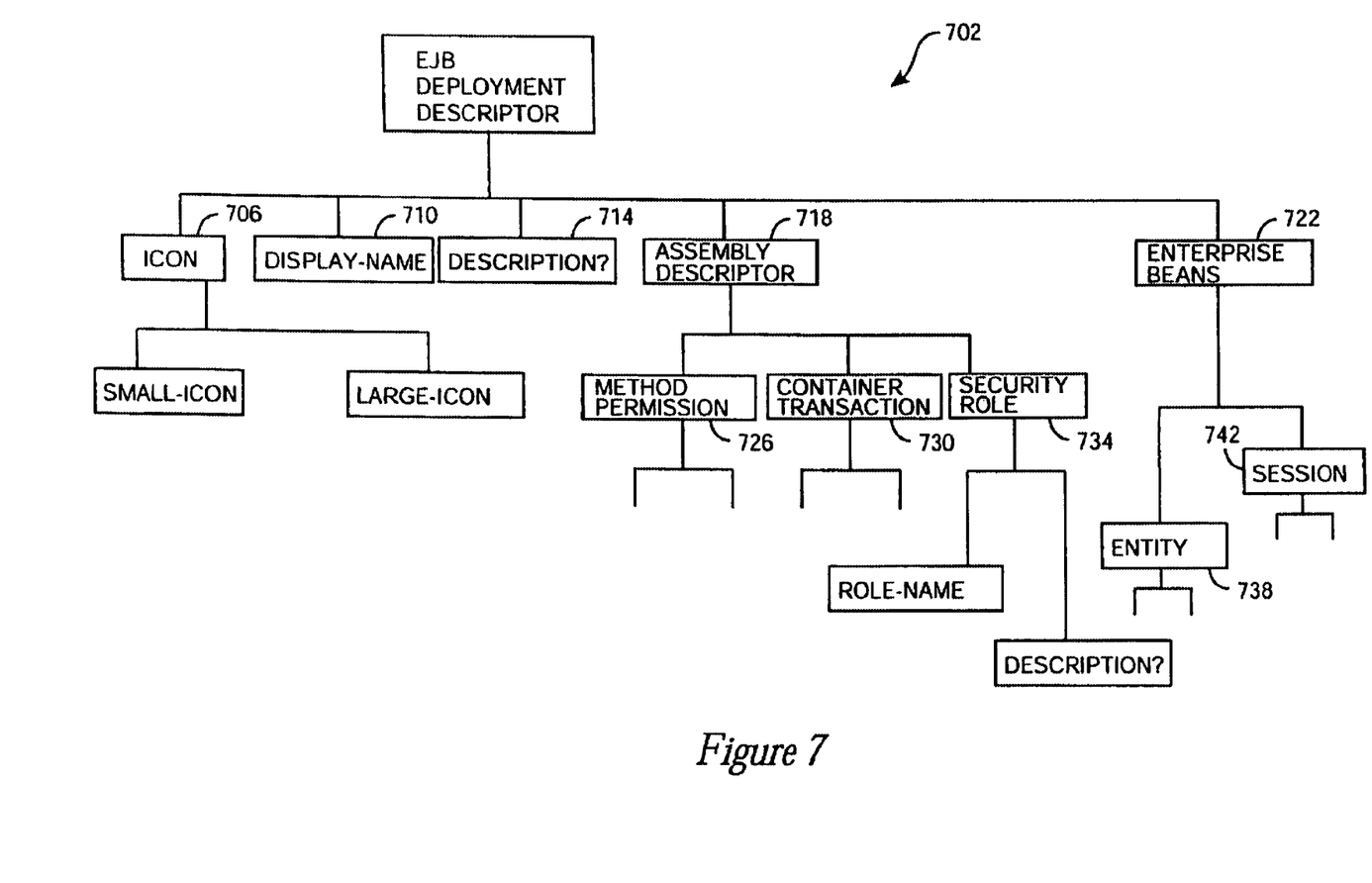
FIG. 7 is a diagrammatic representation of an Enterprise JavaBeans™ (EJB™) architecture module deployment descriptor in accordance with an embodiment of the present invention.

FIG. 7 is a diagrammatic representation of an Enterprise JavaBeans™ (EJB™) architecture component module deployment descriptor in accordance with an embodiment of the present invention. An EJB™ architecture component deployment descriptor 702 may have contents that vary depending, at least in part, upon the requirements of a particular tem. In the embodiment as shown, EJB™ architecture component deployment descriptor 702 includes an icon entry 706, a display-name entry 710, an optional description entry 714, an assembly descriptor entry 718, and an enterprise beans entry 722.

Icon entry 706, which may be referred to as an icon element, is similar to icon entry 606, as discussed above with reference to FIG. 6. That is, icon entry 706 may be a URI which identifies a gif image or a jpeg image that represents the EJB™ architecture component module that corresponds to EJB™ architecture component deployment descriptor 702 with respect to a GUI. Display-name entry 710 is generally a name that is assigned to the EJB™ architecture component module by a developer, and is arranged to identify the EJB™ architecture component module to a deployer at deployment time. Optional description entry 714, when used, may provide information that a developer believes would be of use to a deployer in a user-readable format.

Assembly descriptor entry 718 contains information which is arranged to a facilitate the assembly of a EJB™ architecture component module into an application package. In one embodiment, assembly descriptor entry 718 may include information that pertains to method permissions 726, container transaction 730, and security roles 734. Method permissions 726 typically relate to the management type of an entity EJB™ architecture component in terms of persistence. Container transactions 730, e.g., a container transaction element, generally specifies how a container manages transaction scopes for the method invocations of an EJB™ architecture component. In one embodiment, container transactions 730 may include an optional description, a list of method elements, and a transaction attribute. Security-roles 734, or a security role element, contains a definition of a security role with respect to the EJB™ architecture component module. Security-roles 734 may include both a description of the security role, and an assigned name of the security-roles.

Enterprise beans entry 722, i.e., EJB™ architecture component element 722, includes an entity element 738 and a session element 742. Entity element 738 is arranged to declare an entity bean, e.g., a persistent bean. Although the declaration of an entity bean may include substantially any suitable information, the declaration typically includes the names of the home and remote interfaces of the entity bean, the implementation class of the entity bean, and the persistence management type of the entity bean. Session element 742 is arranged to declare a session bean, e.g., a transient bean. In one embodiment, session element 742 includes the names of the home and remote interfaces of the session bean, the state management type of the session bean, and the transaction management type of the session bean.

Figure 8:
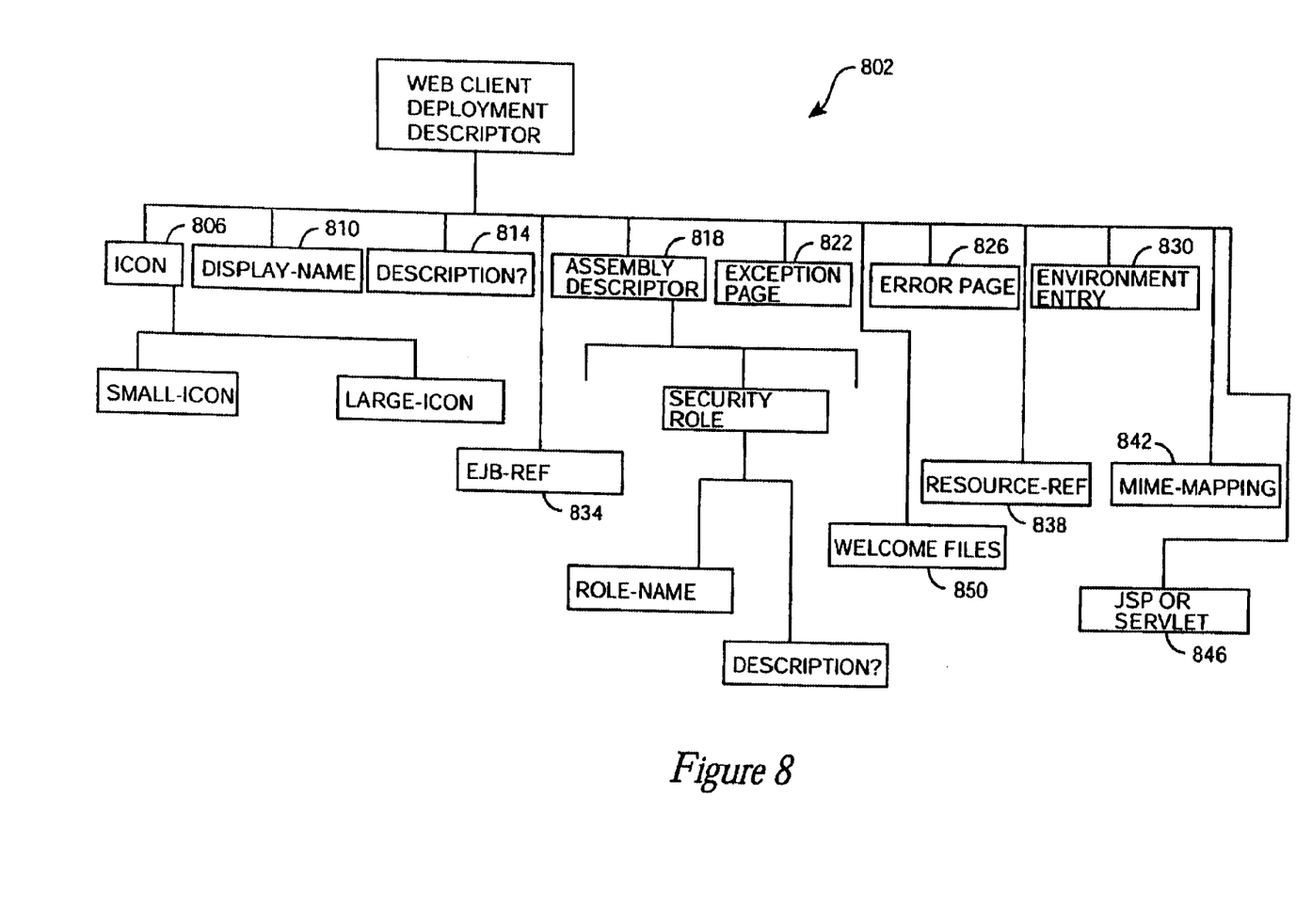
FIG. 8 is a diagrammatic representation of a web client module deployment descriptor in accordance with an embodiment of the present invention.

Referring next to FIG. 8, an example of a web client module deployment descriptor will be described. FIG. 8 is a diagrammatic representation of a web client module deployment descriptor in accordance with an embodiment of the present invention. In the described embodiment, the contents of web client deployment descriptor 802 includes an icon entry 806, a display-name entry 810, an optional description entry 814, an assembly descriptor 818, an exception page entry 822, and an error page entry 826. In addition, web client module deployment descriptor 802 also includes an environment entry 830, an EJB™ architecture component reference entry 834, a resource-reference entry 838, a mime-mapping entry 842, a JavaServer Pages™ (JSP®) page or servlet entry 846, and a welcome file entry 850.

Icon entry 806 identifies a gif image or a jpeg image that represents the application with respect to a GUI, while display-name entry 810 may be a name for the web client module. Optional description entry 814 may be arranged to provide substantially any information that a module developer believes may be relevant to either or both an application assembler and a deployer in a user-readable format.

Assembly descriptor entry 818 includes a security-role element which identifies a security role with respect to the web client module. The security-role element may include both a description of the security role, and an assigned name of the security role. Exception page entry 822 is arranged to contain the class name of an exception, e.g., an exception defined in the JAVA® programming language. Error page entry 826 is arranged to contain a valid, numeric HTTP error-code.

In one embodiment, environment entry 830 contains a declaration of the environment associated with a web application. The declaration may include an optional description, the name of the environment entry, and an optional value. EJB• architecture component reference entry 834 is arranged to be used for the declaration of reference to a home of an EJB™ architecture component. Resource-reference entry 838 specifies the name of a resource factory reference name, or the name of an environment entry of a web application whose value contains the JNDI name of the associated data source.

Mime-mapping entry 842 contains a mapping of a universal record locator (URL) pattern to a mime type, as will be appreciated by those skilled in the art. In the described embodiment, mime-mapping entry 842 may include a specific URL, a directory of URLs, or a hierarchy of URLs. JSP® page or servlet entry 846 generally includes either declarative data for a JSP® page, e.g., a URI to a JSP® page file and the name of an initialization parameter, or declarative data of a servlet, e.g., a class name and a JAR element name. Welcome files entry 850 typically contains an ordered list of welcome files.

FIG. 9 is a diagrammatic representation of an application client module deployment descriptor in accordance with an embodiment of the present invention. In general, the contents of application client deployment descriptor 902 includes an icon entry 906, a display-name entry 910, an optional description entry 914, an environment-entry element 918, an EJB™ architecture component reference entry 922, and a resource reference entry 926. Icon element 906 identifies a gif image or a jpeg image that represents the application client module with respect to a GUI, while display-name entry 910 may be a name for the application client module. Optional description entry 914 typically provides information that a module developer believes may be relevant to either or both an application assembler and a deployer. The information in optional description entry 914 is typically organized in a user-readable format.

Environment-entry element 918, in one embodiment, contains a declaration of an environment entry for an application client module. Although the declaration may vary widely, the declaration often includes an optional description, the name of the reference environment entry, and an optional value for the environment entry. EJB™ architecture component reference entry 922 is typically used to declare a reference to the home of an EJB™ architecture component. Such a declaration may include, but is not limited to, an optional description, a reference name for the EJB™ architecture component, an expected type for the reference EJB™ architecture component, expected home and remote interfaces, and EJB™ architecture component link information. Resource-reference entry 926 contains a declaration of a reference to an external resource of an application client module. The declaration, in the described embodiment, includes an optional description, a resource reference name, and an indication of the data source type of the resource that is expected.

Figure 10:
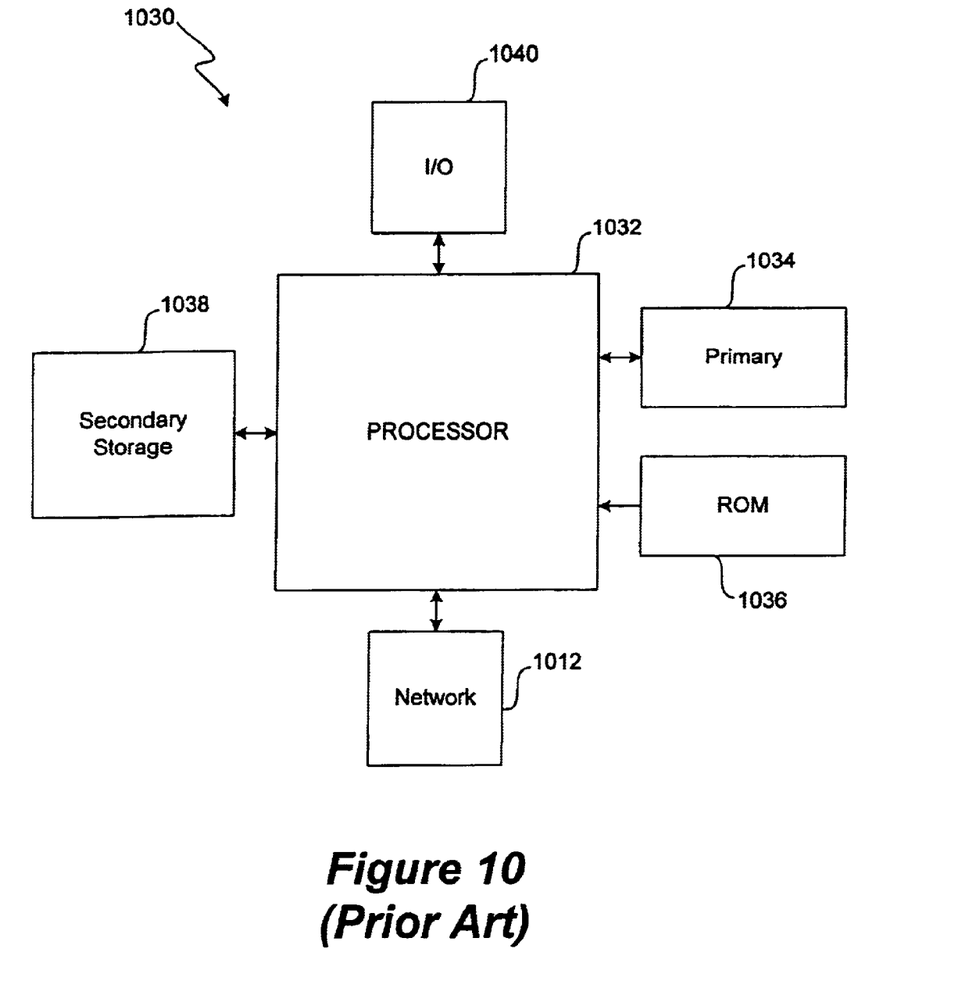
FIG. 10 is a diagrammatic representation of a computer system suitable for implementing the present invention.

FIG. 10 illustrates a typical, general-purpose computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM)

Computer system 1030 or, more specifically, CPU 1032, may be arranged to support a virtual machine, as will be appreciated by those skilled in the art. One example of a virtual machine that is supported on computer system 1030 is a Java™ virtual machine (JVM™ virtual machine). As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the invention. By way of example, steps involved with assembling an application which uses deployment descriptors may be reordered, removed or added. In general, steps involved with the methods of the present invention may be reordered, removed, or added without departing from the spirit or the scope of the present invention.

In general, the contents of a deployment descriptor may vary. By way of example, although deployment descriptors have been described as not including attributes, e.g., XML attributes, in one embodiment, deployment descriptors may include attributes. By not using attributes, however, the need to determine the difference between an entry, or element, in a deployment descriptor and an attribute may effectively be eliminated.

While the present invention has been described in terms of a J2EE® platform, it should be appreciated that the present invention may be implemented on substantially any suitable platform. Therefore, the present examples are to be considered as illustrative and not restrictive, and the invention is not to be limited to the details given herein, but may be modified within the scope of the appended claims.

What is claimed is:

1. A method for deploying an application for use on a platform server, the application being deployed by a deployment tool, the method comprising:

creating the application, wherein creating the application includes grouping a plurality of application components into at least one application module, the application module having an associated application component deployment descriptor, the application component deployment descriptor including information relating to the deployment of the application components;

creating an application deployment descriptor for the application, the application deployment descriptor including identification information arranged to identify the application including identification of the at least one application module, wherein the application deployment descriptor is an XML document;

packaging the application in an archive, the archive including the application module, the application component deployment descriptor, and the application deployment descriptor; and deploying the application packaged in the archive, wherein the application packaged in the archive is deployed using the application component deployment descriptor.

2. A method for deploying an application as recited in claim 1 wherein creating the application further includes obtaining a second application module having an associated application component deployment descriptor.

3. A method for deploying an application as recited in claim 2 wherein the application deployment descriptor includes information arranged to identify the second application module, and the archive further includes the second application module and the application component deployment descriptor associated with the second application module.

4. A method for deploying an application as recited in claim 3 wherein deploying the application packaged in the archive further includes using the application component deployment descriptor associated with the second application module.

5. A method for deploying an application as recited in claim 1 wherein the application is an enterprise application, and one of the application components is one selected from the group consisting of an enterprise bean and a web application.

6. A method as recited in claim 1, wherein the identification information includes a link to the application component deployment descriptor associated with the module.

7. A method as recited in claim 6, wherein the link is a version link.

8. A method as recited in claim 1, wherein the identification information includes a name of the application.

9. A method as recited in claim 1, wherein the identification information includes a description of the application.

10. A computer program product for deploying an application for use on a platform server, the application being deployed by a deployment tool, the computer program product comprising:

computer code for creating the application, wherein the computer code for creating the application includes computer code for grouping a plurality of application components into at least one application module, the application module having an associated application component deployment descriptor, the application component deployment descriptor including information relating to the deployment of the application components;

computer code for creating an application deployment descriptor for the application, the application deployment descriptor including identification information arranged to identify the application including identification of the at least one application module, wherein the application deployment descriptor is an XML document;

computer code for packaging the application in an archive, the archive including the application module, the application component deployment descriptor, and the application deployment descriptor, computer code for deploying the application packaged in the archive, wherein the application packaged in the archive is deployed using the application component deployment descriptor; and a computer readable medium that stores the computer codes.

11. A computer program product for deploying an application as recited in claim 10 wherein the computer code for creating the application further includes computer code for obtaining a second application module having an associated application component deployment descriptor.

12. A computer program product for deploying an application as recited in claim 11 wherein the application deployment descriptor includes information arranged to identify the second application module, and the archive further includes the second application module and the application component deployment descriptor associated with the second application module.

13. A computer program product for deploying an application as recited in claim 12 wherein the computer code for deploying the application packaged in the archive further includes computer code for using the application component deployment descriptor associated with the second application module.

14. A computer program product for deploying an application as recited in claim 10 wherein the application is an enterprise application, and one of the application components is one selected from the group consisting of an enterprise bean and a web application.

15. An archival data structure embodied in a computer readable medium for use with an application, the application being suitable for deployment on a computer system, the data structure comprising:

at least one application module including a grouping of a plurality of application components;

an application deployment descriptor, the application deployment descriptor including identification information arranged to identify the application including the at least one application module, wherein the application deployment descriptor is an XML document; and an application component deployment descriptor associated with the application module, the application component deployment descriptor including information relating to the deployment of the application components, wherein the application component is deployed on the computer system using the application component deployment descriptor;

wherein the application module, the application deployment descriptor, and the application component deployment descriptor are embodied in the computer readable medium.

16. The archival data structure according to claim 15 further including:

a second application module; and a second application component deployment descriptor associated with the second application module;

wherein the second application module and the second application component deployment descriptor are embodied in the computer readable medium.

17. An archival data structure according to claim 16 wherein the application deployment descriptor is further arranged to identify the second application module.

18. An archival data structure according to claim 17 wherein the application deployment descriptor is still further arranged to specify an interaction between the application module and the second application module.

19. A method for deploying an application for use on a server in a container-based computing environment, the application being deployed by a deployment tool, the method comprising:

creating the application, wherein creating the application includes obtaining at least one application module comprising a plurality of components, the at least one application module having an associated module deployment descriptor, the module deployment descriptor including declaration data that is needed to deploy, using the deployment tool, the plurality of components;

creating an application deployment descriptor for the application, the application deployment descriptor including identification information arranged to identify the application including the at least one application module, wherein the application deployment descriptor is an XML document;

packaging the application in an archive, the archive including the at least one application module, the module deployment descriptor, and the application deployment descriptor; and deploying the application packaged in the archive, wherein the application packaged in the archive is deployed using the module deployment descriptor and the application deployment descriptor.

20. A method as recited in claim 19, wherein the module deployment descriptor includes information relating to the deployment of the plurality of components of the at least one application module, thereby allowing at least one of the plurality of components to interact with another pre-existing component.

21. A method as recited in claim 19,
   wherein the plurality of components have a plurality of associated component deployment descriptors, and
   wherein the method further comprises:
      installing the plurality of components; and
      configuring a container to reflect descriptions of the component deployment descriptors.

* * * * *

UNITED STATES PATENT AND TRADEMARK OFFICE
CERTIFICATE OF CORRECTION

PATENT NO. : 6,892,382 B1
DATED : May 10, 2005
INVENTOR(S) : Hapner et al.

It is certified that error appears in the above-identified patent and that said Letters Patent is hereby corrected as shown below:

Title page,
Item [56], References Cited, OTHER PUBLICATIONS, add:
-- "JAR Guide", April 28, 1999, Sun Corporation
  "jar - the Java Archive Tool", April 18, 1999, Sun Corporation
  Dell, Thompson et al. "Manifest Format", April 28, 1999, Sun Corporation --.

Column 5,
Line 31, change "Sum Microsystems" to -- Sun Microsystems --.

Column 7,
Line 40, change "stand-along" to -- stand-alone --.

Column 9,
Line 2, change "particular tem" to -- particular system --.
Line 10, change "identities a gif" to -- identifies a gif --.

Column 10,
Line 67, change "reference EJB$^{TM}$" to -- referenced EJB$^{TM}$ --.

Column 11,
Line 51, change "an internet" to -- an internet network --.

Signed and Sealed this

Tenth Day of January, 2006

JON W. DUDAS
*Director of the United States Patent and Trademark Office*